Sept. 20, 1966   R. L. FORWARD   3,273,397
MEASUREMENT OF STATIC FORCE FIELD GRADIENTS
Filed June 5, 1964   6 Sheets-Sheet 1

INVENTOR.
ROBERT L. FORWARD,
BY J. K. Haskell
ATTORNEY.

Sept. 20, 1966  R. L. FORWARD  3,273,397
MEASUREMENT OF STATIC FORCE FIELD GRADIENTS
Filed June 5, 1964  6 Sheets-Sheet 2

INVENTOR.
ROBERT L. FORWARD,
*J. K. Haskell*
ATTORNEY.

Sept. 20, 1966 R. L. FORWARD 3,273,397
MEASUREMENT OF STATIC FORCE FIELD GRADIENTS
Filed June 5, 1964 6 Sheets-Sheet 5

INVENTOR.
ROBERT L. FORWARD,
BY J. K. Haskell
ATTORNEY.

Sept. 20, 1966

R. L. FORWARD 3,273,397

MEASUREMENT OF STATIC FORCE FIELD GRADIENTS

Filed June 5, 1964

INVENTOR.
ROBERT L. FORWARD,
BY
ATTORNEY.

United States Patent Office 3,273,397
Patented Sept. 20, 1966

3,273,397
MEASUREMENT OF STATIC FORCE FIELD GRADIENTS
Robert L. Forward, Oxnard, Calif., assignor to Hughes Aircraft Company, Culver City, Calif., a corporation of Delaware
Filed June 5, 1964, Ser. No. 372,866
14 Claims. (Cl. 73—382)

The present invention relates to force field measurements and, more particularly, to an instrument for measuring the static gradients of a force field such as a gravitational field, an electrical field or a magnetic field.

The measurement of force fields, such as gravitational, electrical or magnetic force fields, is of importance in several technological areas. For example in geological surveying, minute variations in the gravitational or magnetic fields of a geographic area may be indicative of the extent of ore bodies and the location of oil-containing formations. The conventional method of measuring the force fields of a region is to make a large number of individual measurements of the relative intensity at different locations. The making of stationary field measurements is a very time-consuming process since the measuring instruments must be carried from point to point over the whole area to be surveyed.

Attempts have been made to modify force field measuring instruments so that they are usable in moving vehicles such as boats, airplanes and trucks so that large areas can be rapidly surveyed. These attempts have not been entirely successful. For example, conventional gravity meters generally comprise some form of a mass suspended by a spring and are therefore inherently responsive to accelerations and rotations. Thus, their use in a moving and vibrating vehicle is very difficult. Although great effort has been expended in developing damping systems to integrate out vertical accelerations and stabilized platforms to eliminate horizontal accelerations, the resulting systems are not capable of making detailed enough measurements.

The readings obtained from standard gravity meters placed on the ground have a sensitivity of better than $\frac{1}{10}$ milligal $10^{-4}$ cm./sec.$^2$), which is more than accurate enough for geological work. In an airplane, the sensitivity is limited to 10 milligals with an integration time of one minute or more; in boats, with an integration time of 15 seconds the sensitivity is limited to 3 milligals in calm seas and 20 milligals in moderate seas. This is good enough only for general survey work as many significant geological details have characteristic anomalies of one milligal or less. A major part of the problem is that the earth's gravitational field is on the order of 980,000 milligals, and the measurement of anomalies of one milligal or less corresponds to a measurement of better than one part in a million.

Attempts to modify conventional magnetometers for use in moving vehicles has been more successful since the usual dip needles and flux gate magnetometers are not as sensitive to vibrations and accelerations as are gravity meters. This is further eased by the fact that the variation in the magnetic field induced by typical geologically interesting regions is of the order of 10 gammas ($10^{-4}$ gauss), which is only about one part in ten thousand of the magnetic field of the earth which is ½ gauss or 50,000 gammas. However, such airborne instruments still remain sensitive to variations in the measured component of the earth's field caused by motion of the using vehicle in altitude or orientation. They are also sensitive to the diurnal and magnetic storm variations.

Since it is the spatial variations in the force fields that are of interest, rather than the absolute strength of the field or the temporal variations, there is a need for instruments that only respond to the gradients indicative of the spatial distortions in the force fields. The gradient is the rate of change of the intensity of the field as a function of distance. The gradients are composed of several components, of which several may be of interest.

One advantage of a gradient measuring instrument is that the measurement does not need to be as accurate as an intensity measuring instrument. For example, a gravity gradient sensor only needs to be accurate to one part in one thousand rather than the one part in a million necessary for an intensity measuring device.

An advantage of a gravitational gradient meter is that a properly designed and constructed gravity gradient sensor will not respond to accelerations, since accelerations do not have gradient characteristics.

An advantage of electric and magnetic gradient sensors are that they are practically insensitive to the effects of diurnal variations and other electric and magnetic disturbances such as those caused by storms and other weather conditions.

One instrument presently in use for measuring static gravitational gradients is the Eötvös torsion balance which employs two equal weights at different heights connected by a horizontal beam and suspended by a torsion wire so that it is free to rotate in a horizontal plane about the wire. The beam rotates only when a differential horizontal force acts on the weights, and this occurs when the gravitational field is distorted so that the horizontal component at one end is different from that at the other. A number of measurements are taken with the beam at different azimuthal orientations and the results are employed in equations which, when solved, provide a plurality of quantities which define the gradient and curvature. The torsion balance has only limited usefulness due to the length of time required to make measurements.

Another gravitational gradient sensor has been developed and operated by Prof. J. Weber, Prof. D. M. Zipoy and Mr. Robert L. Forward at the University of Maryland (see J. Weber, "Detection and Generation of Gravitational Waves," Physical Review, vol 117, p. 311, note added in proof, January 1, 1960; and R. H. Dicke, P. A. Roll and J. Weber, "Gravity Experiments," International Science and Technology, pp. 50–64, May 1964).

This device is designed and operated as a detector for gradients of a dynamic rather than a static gravitational field. These include the gradients of dynamic Newtonian gravitational fields caused by nearby moving of vibrating masses and the gradients of gravitational waves which are postulated by the Einstein theory of gravity (General Theory of Relativity) as being waves of gravitational fields emitted by accelerating masses. The device described by Weber, Zipoy and Forward consists of a 3,000-pound cylinder of aluminum two feet in diameter and five feet long suspended from a wire loop inside a vibrationally isolated vacuum chamber. By its construction, it is primarily responsive to a dynamic gravitational gradent along the axis of the cylinder at a frequency of 1,657 c.p.s. The vibrations induced in the metal cylinder are detected by piezoelectric strain transducers and amplified by sensitive amplifiers of unique construction. The device has a response that varies with its orientation with respect to the source of the dynamic gravitational gradient, so that if it is slowly rotated, the detector response to the dynamic gravitational fields will vary. This device in its presently conceived construction and mode of operation does not respond to static gravitational gradients, but only dynamic gravitational gradients at the frequency of mechanical resonance of the cylinder.

As to the measurement of a magnetic gradient, at present this type of gradient is measured by comparing the induced electromotive forces in two similar induction coils spaced a distance apart with parallel axes of rotation and rotatable at the same speed. (See J. Roman and T. C. Sermon, "A Magnetic Gradiometer," AIME Geophysical Prospecting, pp. 373–388, 1934.) This is merely a simple combination of two force measuring instruments with opposed outputs. This magnetic gradiometer does not have the ability to measure directly the higher derivative gradients.

Electric and magnetic gradient sensors are also well known in the field of direction finding antennas. Such antennas are described in texts such as Radio Direction Finders, by Donald S. Bond, McGraw-Hill Book Co., Inc., New York (1944), Fig. 3.23, p. 98 and Fig. 3.26, p. 100. These devices are designed and operated as detectors for the dynamic gradient of electric or magnetic fields emitted by a low frequency transmitter. By construction, these antennas are primarily responsive to the time varying component of the gradient of a magnetic or electric field across the antenna. The antennas have a response that varies with orientation with respect to the source so that if they are rotated, the detector response to the dynamic electric or magnetic fields will vary. Depending upon the construction, the minima or maxima will indicate the direction to the transmitter. As presently conceived and operated, these devices do not respond to static electric or magnetic gradients but only dynamic gradients at the frequency of electrical resonance of the antenna.

The devices of the invention, although in some respects similar to the electric, magnetic and gravitational gradient antennas previously described, are derived from a different manner of construction and a different mode of operation. The devices of the invention do not require a source of time varying fields for their operation. The devices of the invention are designed to be deliberately rotated at relatively high speed and to resonate at relatively lower frequencies than the previously described electromagnetic and gravitational antennas so that the resonance frequency is a small multiple of the rotation frequency (the multiple chosen depending upon the gradient to be measured). Thus, the electrically resonant rotating magnetic and electric gradient sensors of the invention are to be considered as improvements upon the direction finding antennas described in texts such as by Bond; the electrically resonant rotating gravitational gradient sensors of the invention are to be considered as improvements on the piezoelectric gravitational antenna described in the paper by J. Weber, "Detection and Generation of Gravitational Waves," Physical Review, vol. 117, p. 309 ff.; and the mechanically resonant rotating gravitational gradient sensors of the invention are to be considered as improvements on the gravitational antenna of Weber, Zipoy and Forward.

This different philosophy of construction and mode of operation enable the devices of the invention to measure the static gradients of the fields, which these prior art antennas cannot do. This ability to measure the static gradient fields makes the devices of the invention more useful, since the fields to be measured in geological work are essentially static gradient fields.

Another gradient of interest is the second derivative gradient, one example of which is the vertical rate of change of the gradient of gravity with depth. The second vertical derivative is now obtained by graphical methods. The importance of the second derivative arises from the fact that the double differentiation tends to emphasize the smaller, shallower geologic anomalies at the expense of larger regional features.

The higher derivative gradients are very important when one is attamepting to measure the field distortion due to a small, nearby object in the presence of large bodies further away. For example, the second derivative gradient of the gravitational field from a 600-kilogram object 6 meters away is equal to or larger than the second derivative gradient of the earth. The third, fourth and higher derivative gradients show even more discrimination. There has never been proposed any device to directly measure the higher derivative static gradients of a force field.

Accordingly, it is an object of the present invention to provide an instrument for the measurement of the static gradients of a force field.

Another object of the invention is the provision of an instrument for the measurement of the static gradients of a gravitational field.

Yet, another object of the present invention is to provide an instrument for the measurement of the static gradients of a magnetic field.

Still another object of the invention is the provision of an instrument for the measurement of the static gradients of an electrical field.

Another object of the present invention is to provide an instrument for directly measuring the higher derivative static gradients of a force field.

A further object of the invention is the provision of a force field measuring instrument which discriminates between the effects associated with a relatively small local body and the effects of a large body.

A still further object of the present invention is to provide a gravitational force field measuring instrument which discriminates against inertial effects such as acceleration or rotation.

In accordance with these and other objects of the invention, there is provided a resonant energy storage device including a plurality of sensing elements responsive to a particular force field coupled thereto. Periodic motion is imparted equally to the sensing elements to induce energy in the form of a periodically varying complex signal having gradient connoting components related to the frequency of the periodic motion of the sensing elements through the force field being measured. The energy storage device is tuned to a selected component frequency corresponding to a selected force gradient and is excited by the energy having the selected frequency to provide a large amplitude response to this selected signal component. The energy storage device includes means coupling out an electrical signal indicative of the energy in the storage device. The frequency selected determines which derivative of the force field gradient is measured, that is, second order, third order, etc. The magnitude of the particular signal component is proportional to the magnitude of the related gradient and the phase of the particular signal component is indicative of the directional sense of the gradient.

In an exemplary embodiment of a gravitational gradient sensor, the resonant energy storage device is a rotating elongated member having a resonant mechanical vibration mode at a multiple of the rotation frequency. The sensing elements responsive to the gravitational field are masses at the ends of the member. However, the mass of the elongated member itself may be employed as the sensing elements. Strain transducers mounted on the rotating member couple out electrical signals indicative of the vibrational energy in the resonant member.

In an exemplary embodiment of a magnetic gradient sensor, the resonant energy storage device is a resonant electrical circuit. The sensing elements responsive to the magnetic field are conductive loops disposed at the ends of a rotating support bar and differentially connected to the resonant circuit.

In an exemplary embodiment of an electrical gradient sensor, the resonant energy storage device is a resonant electrical circuit. The sensing elements responsive to the electrical field are rotating conductive rods or dipole elements which are differentially connected to the resonant circuit.

The following specification and the accompanying drawings describe and illustrate exemplary embodiments of the present invention. Consideration of the specification and the drawings will provide an understanding of the invention, including the novel features and objects thereof. Like reference characters denote like parts throughout the figures of the drawings.

The measurement of the variations in a force field as a function of distance or, in other words, the measurement of the gradients of a force field, is accomplished in accordance with the present invention, by a differential method. More particularly, the intensity of the force field at one location is subtracted from the intensity of the force field at another location some distance away, and the difference, or residual intensity, is the variation or gradient of the force field over the aforesaid distance.

Further, the substantially constant or static force field is measured in a dynamic manner by moving the gradient sensor through the force field in a cyclical or periodic fashion. In this manner, the interaction between the sensor and the force field produces a signal having frequency components which are related to the frequency of the periodic motion. The force field produces a signal component having one characteristic frequency. The rate of change of the force field (first derivative or first order gradient) produces a signal component of another characteristic frequency. The rate of change of the rate of change of the force field (second derivative or second order gradient) produces a signal component of yet another characteristic frequency, and so on for all of the higher order gradients. By employing resonant frequency-selective devices to select desired signal components and reject undesired signal components, each gradient of interest may be separately measured.

Figures 1, 2:
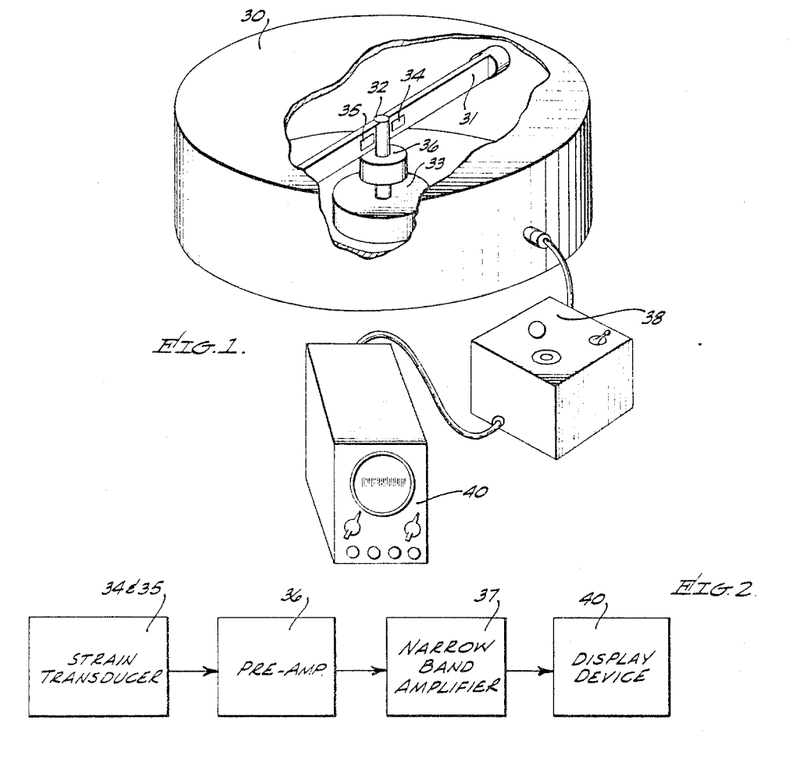
FIG. 1 is a perspective view, partly broken away, of an embodiment of a static gravitational gradient sensor in accordance with the invention.
FIG. 2 is a block diagram of the electronic circuit of the gravitational gradient sensor of FIG. 1.

The exemplary embodiment of a gravity gradient sensor shown in FIG. 1 illustrates the application of the above-described concepts. A housing 30 encloses an elongated member 31 rotatably mounted on a shaft 32 which is turned by a motor 33. The elongated member 31 is provided with electromechanical strain transducers 34, 35 which develop electrical signals in accordance with vibrational strains in the elongated member 31. The signals are amplified by a preamplifier 36 disposed on the rotating shaft 32, further amplified in a frequency-selective narrow band amplifier 37 (FIG. 2) disposed in the external circuit console 38, and applied to a display device 40.

Figure 3:
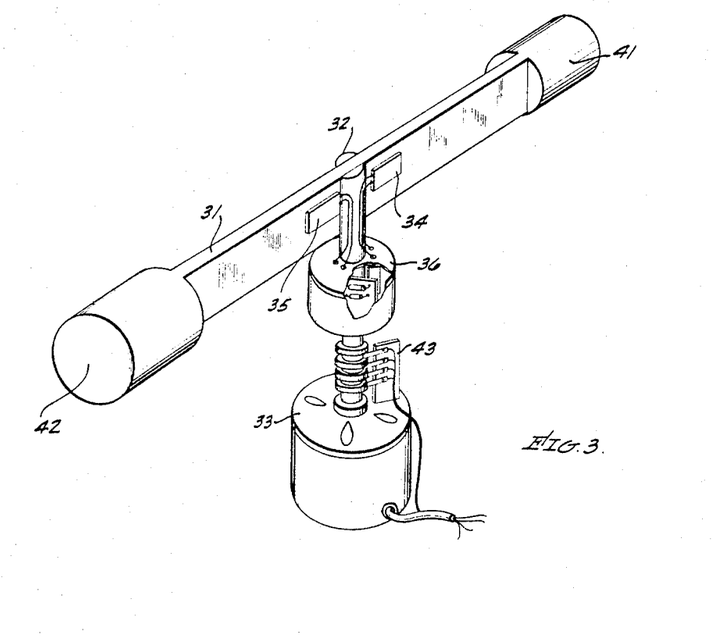
FIG. 3 is a perspective view of the electromechanical portion of the gravitational gradient sensor of FIG. 1.

Referring now to FIG. 3, the elongated member 31 is a thin, rectangular bar on the order of one foot long, one-eighth inch thick and two inches wide. The elongated member 31 is oriented with its thinnest dimension passing through the longitudinal axis of the shaft 32. Cylindrical masses 41, 42 are provided at each end of the elongated member 31. The member 31, including the masses 41, 42, is symmetric about the shaft 32 and is dynamically and statically balanced. The elongated member 31 is made of aluminum alloy, in the present example, and has a resonant mechanical vibration mode in the plane of rotation. That is, the arms of the elongated member 31 vibrate in a manner similar to leaf springs, which they resemble. The mechanical Q of the elongated member 31 is high, for example on the order of 3,000; and the decrement, or time required for the vibration to die away, is on the order of one minute or less. Materials other than aluminum may be employed for the elongated member 31, such as steel or quartz, for example. However, steel may be subject to extraneous magnetic influences.

The elongated member 31 is fastened to the shaft 32 at a vibrational node which, in the present example, is at the center of the elongated member 31. The member 31 may be an integral part of the shaft 32 if desired. For other vibrational modes where the node is not at the center of the member 31, attachment of the shaft 32 to the nodes of the member 31 may be made by means of a bifurcated yoke. In the present example, the frequency of resonance of the elongated member 31 is approximately 200 cycles per second.

The electromechanical strain transducers 34, 35 of the present example are commercially available piezoelectric strain transducers. The strain transducers 34, 35 are cemented to one of the broad surfaces of the elongated member 31 on either side of and adjacent to the shaft 32 to sense the vibrational strains in the member 31 at the node. Alternatively, motion-measuring transducers may be employed at the antinodes, if desired. The strain transducers 34, 35 are matched insofar as possible to provide equal output voltages for equal amounts of strain. The electrical leads from the strain transducers 34, 35 are connected in parallel at the input to the preamplifier 36. The transducers 34, 35 are differentially connected. That is, they are poled oppositely so that equal forces applied at the ends of the elongated member 31 in directions transverse to the shaft 32 produces substantially zero output voltage at the input to the preamplifier 36.

The ransducers 34, 35 are matched to the input of the preamplifier 36 so as to transfer the maximum amount of signal thereto. An inductor may be connected across the transducers 34, 35 at the input to the preamplifier 36 to tune them for maximum response at frequency of interest which, in the present example, is 200 cycles per second. The preamplifier 36 is located on the shaft 32 so that the signal from the transducers 34, 35 may be amplified immediately to a high level before a significant amount of electrical noise and other extraneous electrical transients have been introduced. The preamplifier 36 provides a gain on the order of 30 decibels and is only required to pass frequencies in the vicinity of 200 cycles per second. The amplified signal from the output of the preamplifier 36 is coupled out of the rotating preamplifier 36 by a slip ring arrangement 43, as illustrated in FIG. 3. Alternatively, the amplified signal may be broadcast from the preamplifier 36 by a diminutive radio transmitter.

The motor 33 rotates the shaft 32 at a constant speed of 6,000 revolutions per minute which is 100 revolutions, or cycles, per second. The motor 33 may be of the synchronous type and driven from an oscillator-amplifier combination, if desired, so that its speed may be readily adjusted by changing the frequency of the oscillator. The narrow band amplifier 37 (FIG. 2) provides additional gain on the order of 100 decibels, for example. The narrow band amplifier 37 includes filters, such as mechanical filters for example, that provide a bandwidth on the order of 5 cycles centered around 200 cycles per second. The display device 40 may be a conventional cathode ray oscilloscope, as indicated in FIG. 1, or a pen and ink recorder, or any other suitable means for displaying the amplified signal.

The housing 30 (FIG. 1) may be evacuated to isolate the elongated member 31 from extraneous acoustical vibrations transmitted through the air. A vacuum of a few millimeters of mercury is sufficient for this purpose. The motor 33 and the rotating elements supported thereby may be acoutically isolated from the housing 30 by means of shock and vibration isolation mountings, and the housing 30 may also be provided with external shock and vibration isolation mountings. Acoustical filtering may be employed in the coupling between the motor 33 and the elongated member 31 to prevent the introduction of extraneous acoustical vibrations by the motor 33. The preamplifier 36 is carefully constructed to prevent microphonics, particularly in the input circuit thereof.

The electronic circuitry, including the leads associated therewith, is carefully shielded to minimize the introduction of extraneous electrical noise, and the preamplifier 36 is designed to have a good noise figure. Magnetic shielding may also be employed if desired. For example, the housing 30 may be formed of a material suitable for magnetic shielding, such as mu-metal. The motor 33 may also be magnetically shielded.

Figure 4:
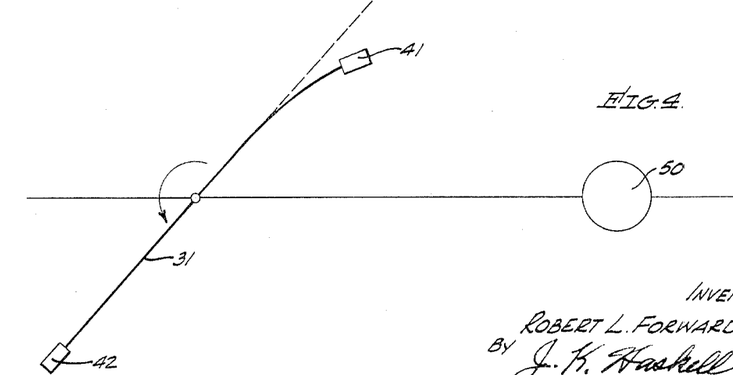
FIG. 4 is a diagram illustrating the operation of the gravitational gradient sensor of FIG. 1.

Referring now to FIG. 4, which is a schematic illustration of the operation of the gravity gradient sensor, for purposes of explanation, assume the motor 33 to be deenergized so that the elongated member 31 is stationary, rather than rotating. Assume also that this gravity gradient sensor is only under the gravitational influence of a single massy object 50 and that the gravitational field of the earth and other objects is, for the moment, nonexistent. According to the law of universal gravitation, there is a force of attraction between the mass 41 at one end of the elongated member 31 and the massy object 50, and between the mass 42 at the other end of the elongated member 31 and the massy object 50. Because the magnitude of the force is inversely proportional to the square of the distance, the force exerted by the massy object 50 on the closest mass 41 is much greater than the force exerted on the farthest mass 42. In response to these forces of attraction, there is a minute strain or flexing in the elongated member 31.

Under these static conditions, the differential strain produced in the member 31 is too small to be conveniently measured. Now, assume that the elongated member 21 is rotating. Each time one of the masses 41, 42 rotates past the massy object 50, a strain impulse is applied to the elongated member 31. Consequently, the member 31 receives two impulses per revolution, and since the member 31 is rotating at the rate of 100 revolutions per second, it receives 200 impulses per second. The elongated member 31 is mechanically resonant at 200 cycles per second and, accordingly, the amplitude of the vibrations increases as each impulse is added. Soon, the strains in the member 31 are no longer minute. The strain transducers 34, 35 develop a constant-amplitude signal at 200 cycles per second whose amplitude is proportional to the difference in the forces of attraction exerted on the two masses 41, 42 by the massy object 50.

Now, assume that the gravity gradient sensor is also under the influence of the earth's gravitational field. In the diagram of FIG. 4, the earth's field is pulling into the paper and exerts an equal pull on each of the masses 41, 42. The direction of the earth's pull is not the direction in which the elongated member 31 readily flexes or vibrates. In addition, there is little or no periodic vibration in the earth's pull on the masses 41, 42 as the elongated member 31 rotates. Accordingly, even though the force of attraction of the earth is very large compared to the force of attraction of the massy object 50, the effects of the earth's gravity are suppressed, whereas the effects of the gravitational attraction of the massy object 50 are enhanced.

Since the amplitude of the 200-cycle-per-second signal is proportional to the difference in the forces of attraction exerted on the two masses 41, 42 by the massy object 50, the gradient measured by the arrangement shown in FIG. 4 is the change in the horizontal gravity intensity over the one foot distance that separates the two masses 41, 42. The amplitude of the signal is directly proportional to the mass of the massy object 50, and inversely proportional to the cube of the distance from the gravity gradient sensor to the massy object 50.

The gravity gradient sensor is sensitive to gravity gradients in all radial directions at the same time. That is, it is omnidirectional in a plane extending along the longitudinal axis of the elongated member 31 and orthogonal to the axis of rotation. Accordingly, no directional information is obtained. However, by employing a reference-signal generator driven by the rotating shaft 32 which generates a signal whose phase is a function of the angle of rotation, it is possible to correlate the phase of the gravity gradient signal (as by a phase-sensitive detector) with the position of the elongated member 31. This provides a bidirectional indication (for example, north-south or east-west). If the massy object 50 extends over a large region, or if there are a number of massy objects distributed around the gravity gradient sensor, it is difficult, if not impossible, to obtain even bidirectional information.

By shifting the location of the gravity gradient sensor, additional information can be obtained about the location of the massy object 50 by comparing the different gravity gradient measurements. The gravity gradient sensor is more sensitive to near objects than to distant ones and provides a large amplitude signal when close to a small mass and responds very little to much larger masses which are some distance away. If the gravity gradient sensor is adapted to provide bidirectional information, the position of the massy object 50 may be triangulated by talking reading at 3 different locations.

By measuring a higher order gradient, even better discrimination against background masses is obtained. For example, to measure the gradient of the gradient, the motor 33 is operated at ⅔ the speed, or 4,000 revolutions per minute (66⅔ revolutions, or cycles, per second). Now, the only forces which excite the 200-cycle resonance of the elongated member 31 are the second order gravity gradient forces. The amplitude of the signal is now inversely proportional to the fourth power of the distance from the gravity gradient sensor to the object being measured. Accordingly, it is now even less responsive to large background masses as compared to smaller nearby masses.

In a similar manner, the next higher order gradient may be measured by reducing the speed of the motor 33 to 3,000 revolutions per minute (50 revolutions, or cycles, per second). The amplitude of the third order gradient signal is inversely proportional to the fourth power of the distance. This procedure may be similarly extended to all of the higher order gradients. If desired, rather than decreasing the speed of the motor 33, the resonant frequency of the elongated member 31 may be increased for each higher order gradient. At the same time, the frequency band of the narrow band amplifier 37 must also be doubled.

Thus, by imparting motion to the elongated member 31 at a particular frequency $f$, the interaction of the periodically moving masses 41, 42 with the static gravitational field results in time-varying forces being applied to the elongated member 31 at multiples of the rotation frequency $f$. The first, second, third and fourth order gradient forces have frequencies of $2f$, $3f$, $4f$ and $5f$, respectively. By tuning the gravity gradient sensor to respond to a particular one of these frequencies, the desired gradient may be measured.

The gravity gradient sensor may be used in a moving vehicle because the random shock, acceleration and vibration effects do not produce time-varying forces on the gravity gradient sensor which have frequency components within its acceptance bandwith.

Figures 5, 6:
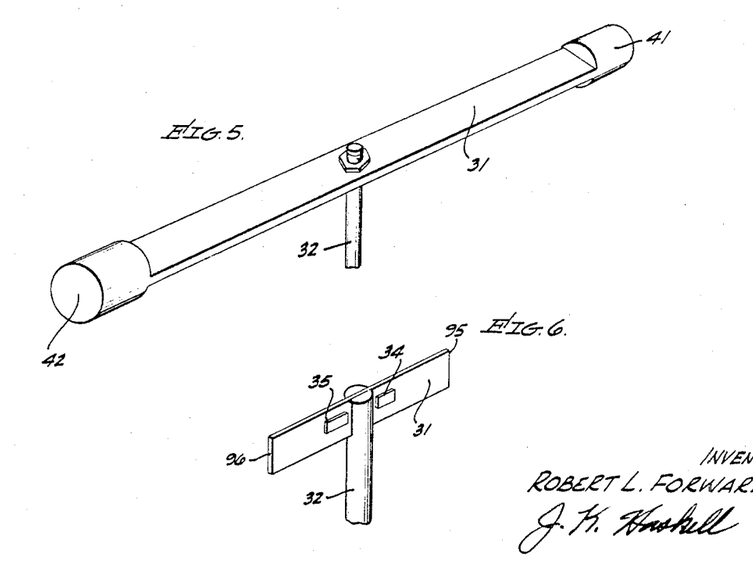
FIG. 5 illustrates an alternative form of a portion of the gravitational gradient sensor of FIG. 1.
FIG. 6 illustrates another alternative form of a portion of the gravitational gradient sensor of FIG. 1.

To measure the vertical gradient of the earth's gravitational field, the gravity gradient sensor illustrated in FIGS. 1 and 3 may be turned on its side with the rotation axis of the shaft 32 horizontal. As an alternative, the elongated member 31 may be fastened to the shaft 32 with its thinnest dimension orthogonal to the longitudinal axis of the shaft 32 as illustrated in FIG. 5. With this orinentation, the resonant vibration mode of the elongated member 31 is in the vertical direction. Consequently, the gravity gradient sensor now measures the rate of change with horizontal distance of the vertical component of gravity. This most nearly corresponds to the measurement made by conventional torsion balance instruments. However, the instrument of the present invention measures the gradient in all azimuthal directions simultaneously, although the phase of the signal may be correlated with shaft angular position, if desired. The present instrument also differs from conventional gradient-measuring instruments in that any desired order of gradient may be measured by appropriate frequency selection.

It is not necessary for the elongated member 31 to be very long, nor is it necessary for it to include massy objects, such as the cylindrical masses 41, 42, at the ends thereof. As shown in FIG. 6, the elongated member 31 may be relatively short, for example six inches in length, and may employ the distributed mass of the arms as the gravitational force sensing elements. The resonant frequency of the mechanical vibrations is determined by the particular dimensions selected. The sensitivity of the gravitational gradient sensor to gravitational forces is determined by the length of the arms.

One method of measuring the gravitational field of a small, local mass in the presence of the gravitational field of a larger, background mass is to operate the gravitational gradient sensor in the mode in which it responds preferentially to the field of the small mass on the basis of relative motion. This is accomplished by slightly shifting the speed of the motor 33 with respect to the resonance frequency of the elongated member 31, and by producing constant-velocity relative motion between the gravitational gradient sensor and the small, local mass to be measured. The result is that the background mass produces a periodic force on the elongated member 31 whose frequency is displaced from the resonant frequency of the elongated member 31. However, the small mass produces a periodic force on the elongated member 31 whose frequency is at or near the resonant frequency of the elongated member 31 due to the relative motion between the sensor and the small mass. In other words, the undesired, larger background force is forced out of the acceptance bandwidth of the gravity gradient sensor, or at least well down on the skirt of the resonance curve.

Figure 7:
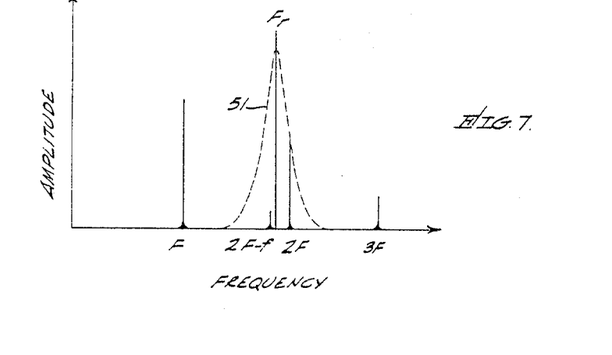
FIG. 7 is a graph of the amplitude of periodic forces acting on the gravitational gradient sensor of FIG. 1 plotted as a function of frequency.

This condition is illustrated in FIG. 7 which shows a graph of the amplitude of the periodic forces acting on the elongated member 31 plotted as function of frequency. Superimposed on the graph is the resonance response curve 51 of the elongated member 31, with the resonant frequency indicated as $F_r$. The frequency of the angular rotation produced by the motor 33 is F and, as indicated on the graph of FIG. 7, there is a peak of vibrational and acceleration forces acting on the elongated member 31 at this frequency F. At 2F there is a large peak of first order gravitational gradient force due to the large background mass. At 3F there is a smaller peak of second order gravitational gradient force, also due to the large background mass. The force at 3F is well outside the acceptance bandwidth of the gravitational gradient sensor, and the force at 2F is well down on the slope of the resonance curve 51 so that its effects are suppressed compared to the effects when $2F = F_r$.

The first order gravitational gradient force due to the small mass being measured occurs at the frequency $2F \pm$, where $f$ is the frequency shift due to the relative motion between the gravity gradient sensor and the object being measured. The frequency shift is usually not large and may be on the order of 2 cycles per second, for example. In FIG. 7, the gravitational gradient force due to the object being measured is $2F - f$. Whether the frequency shift is up or down is determined by the direction of the relative motion in relation to the direction of rotation of the elongated member 31. For example, if the gravity gradient sensor is moving linearly past the object to be measured in a horizontal direction and, if the object being measured is on the right side of the line of motion when looking in the direction of motion, then the line of sight to the object is rotating clockwise, as viewed from above. If the elongated member 31 is rotating in a horizontal plane in a clockwise direction, as viewed from above, then the frequency of the signal shifts down in frequency, but if the elongated member 31 is rotating counterclockwise, then the frequency shifts up. As illustrated in FIG. 7, the force due to the object being measured occurs at or near the resonant frequency $F_r$ of the elongated member 31 and therefore, although it is of small amplitude compared to the force due to the large background mass, it produces a large signal at the output of the gravity gradient sensor.

Figure 8:
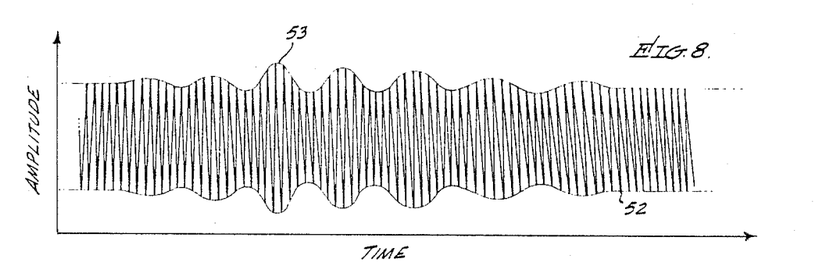
FIG. 8 is a graph of the amplitude of electrical signals at the output of the gravitational gradient sensor of FIG. 1 plotted as a function of time.
Figure 9:
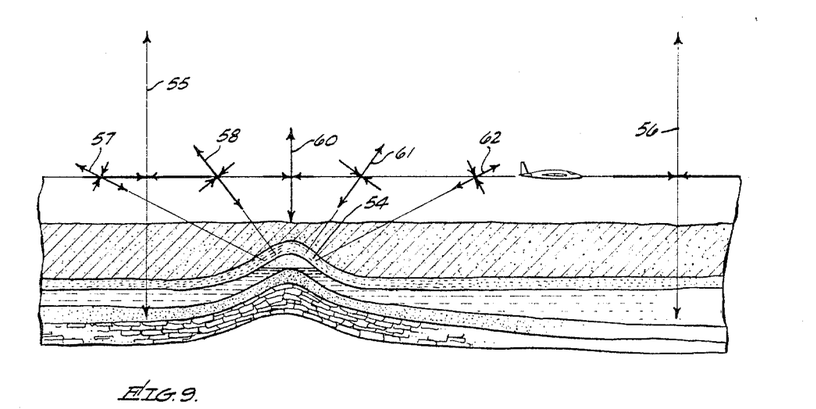
FIG. 9 is an elevational cross-section view of the earth illustrating one method of employing the gravitational gradient sensor of the present invention.

When the gravity gradient sensor is operating under these conditions, the signal at the output appears as shown in FIG. 8, where the component due to the background signal is indicated at 52 and the component due to the small mass being measured is indicated by the low frequency modulation superimposed thereon, as at 53. FIG. 9 shows the measurement being made over an oil field including a folded mass of dense rocks 54. In this example, the elongated member 31 is rotating in a vertical plane and the gravity gradient sensor is moved horizontally directly over the dense rocks 54. The large amplitude gravitational force due to the background mass of the earth is indicated by the groups of arrows 55 and 56 which denote tensor forces. As the gravitational gradient sensor approaches the dense rocks 54, tensor arrows 57 indicate the direction of the line of sight, and that the magnitude of the gravitational force due to the dense rocks 54 is small. As the gravitational gradient sensor proceeds above the rocks 54, the magnitude increases, as at tensor arrows 58, until it reaches a maximum at 60 and then decreases, as at 61 and 62.

The amplitude of the electrical signal developed due to the gravitational force of the dense rocks 54 is on the order of 40 microvolts. This signal voltage appears (as at 53 in FIG. 8) as a small amplitude frequency-shifted signal on top of the large earth gradient signal 52. The fact that it is frequency shifted causes a modulation of the output of the gravitational gradient sensor. This beat-note modulation may, if desired, be detected and filtered at the output of the instrument.

Figures 10, 11, 12:
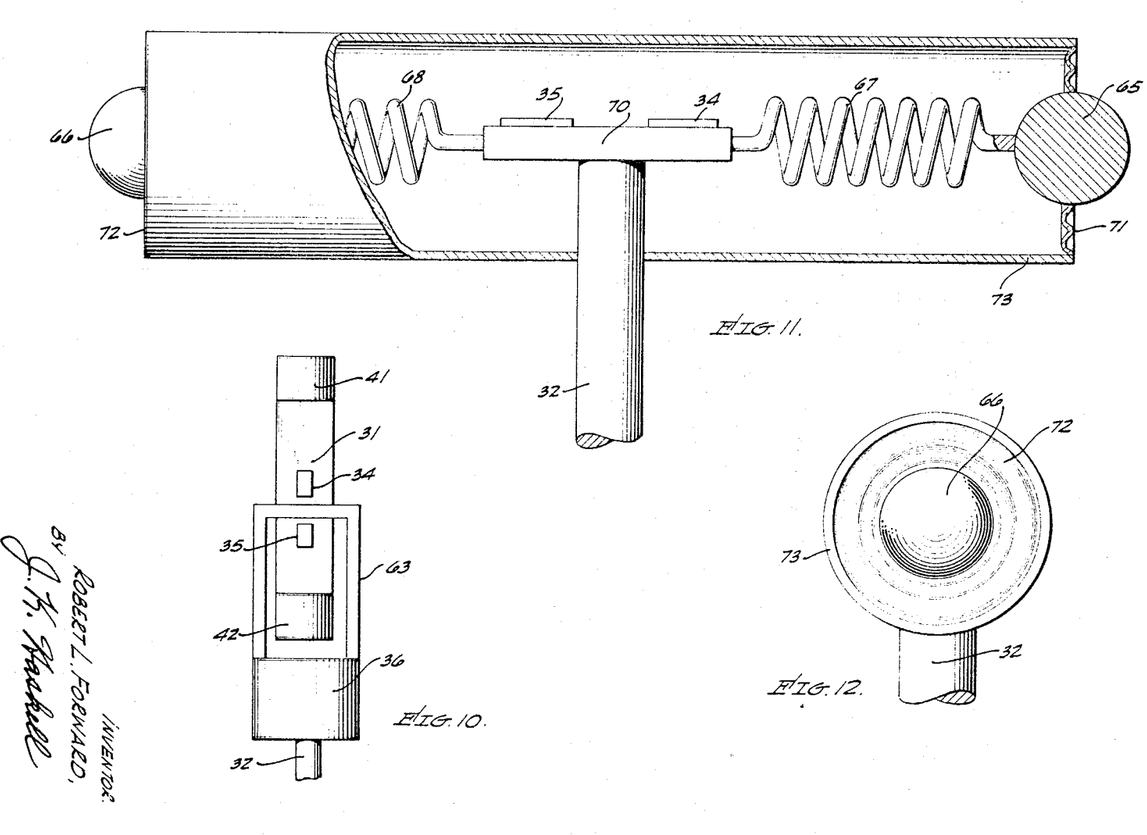
FIG. 10 is still another form of a portion of the gravitational gradient sensor according to the invention.
FIG. 11 is yet another form of a portion of the present gravitational gradient sensor.
FIG. 12 is an enlarged view of a portion of the sensor shown in FIG. 11.

For measuring the torsional gravitational gradient at right angles to the rotational axis of the gradient sensor, the instrument may be constructed as shown in FIG. 10. The elongated member 31 is rigidly suspended from its center or nodal point by a yoke 63, with the longitudinal axis of the elongated member 31 coaxial with the rotating shaft 32. In this arrangement, the elongated member 31 rotates about its longitudinal axis and vibrates perpendicularly to the rotational axis. Similar vibrations are commonly observed in the field of mechanics where a problem of gravitationally driven vibration exists when a drive shaft is rotated at one half its natural vibration frequency. However, in the gravitational gradient sensor of FIG. 10, these gravitationally induced vibrations are not a problem but the desired result. The instrument is sensitive to torsional gradients effective orthogonally to the rotational axis.

For measuring the radial gradient transverse to the axis of rotation and in the plane of rotation, the embodiment of FIGS. 11 and 12 is employed. A pair of spherical masses 65, 66 are coupled by coil springs 67, 68 to a support 70 mounted on the end of the shaft 32 for vibration along a line orthogonal to the shaft 32. The spherical masses 65, 66 are restrained from motion in other than a radial direction by mounting them in the center of circular diaphragms 71, 72. The diaphragms 71, 72 flex toward and away from the support 70, but resist motion in other directions. The diaphragms 71, 72 are supported around their periphery at the ends of a cylindrical tube 73 which is rigidly attached to the shaft 32. The vibrating system, consisting of the masses 65, 66 and the springs 67, 68, is tuned to the desired frequency, for example 200 cycles per second. The strains developed in the support 70 are measured by the electro-mechanical strain transducers 34, 35 attached thereto.

As the instrument is set in motion, centrifugal force causes the masses 65, 66 to move outward. To counterbalance this centrifugal lengthening of the springs 67, 68, the springs 67, 68 are biased so that the masses 65, 66 are pulled slightly inward when the instrument is at rest. When the instrument is put in motion, the masses 65, 66 move outward to the position where the diaphragms 71, 72 are no longer flexed. The proper amount of bias may be obtained by shortening the length of the springs 67, 68 so that they are approximately $11/12$ of the length when the diaphragms 71, 72 are not flexed. The embodiment of FIGS. 11 and 12 is not suitable for measuring the first order gravitational gradient because the springs 67, 68 are used to generate the centripetal force as well as the vibrational restoring force. However, this embodiment may be employed to measure the higher order gradients.

All of the embodiments of the gravitational gradient sensor thus far described have utilized periodic rotary motion to produce periodic gravitational forces. Other types of periodic motion may be employed to produce the same results. For example, the shaft 32 may be periodically oscillated back and forth through only a fraction of a revolution. Another variation is to impart reciprocal linear motion to the elongated member 31 whereby it moves back and forth, either along its longitudinal axis or along a line transverse to the longitudinal axis.

As was mentioned hereinbefore, the elongated member 31 may be made of quartz, if desired. In this case, the electromechanical strain transducers 34, 35 may be combined with the elongated member 31 because, when made of quartz, the member 31 itself generates electrical signals as it vibrates. It is only necessary to apply electrodes in the proper locations to couple out the signals.

When the elongated member 31 is made of electrically-conductive material, capacitive transducers may be employed instead of the strain transducers 34, 35 by locating a metal plate adjacent to the elongated member 31 in a manner such that it rotates with the member 31 and yet is spaced away and insulated therefrom. The vibration of the member 31 changes the capacitance of the arrangement in a periodic manner and this varying capacitance may be employed as the frequency-determining element in an oscillating circuit.

Other energy storage devices may be used in place of the mechanically resonant elongated member 31. For example, magnetic or electric suspensions may be used and they may be made resonant in either an electrical or mechanical mode.

Figure 13:
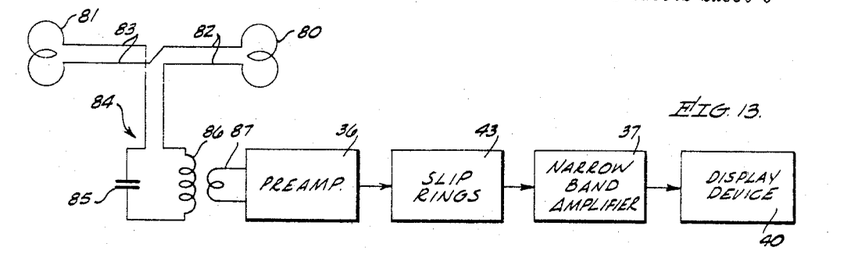
FIG. 13 is a schematic diagram of the electronic circuit of a static magnetic gradient sensor according to the invention.

The principles of static force field measurement according to the present invention may also be applied to the measurement of static magnetic force field gradients. An exemplary embodiment of such a magnetic gradient sensor is shown schematically in FIG. 13. This embodiment consists of two spaced magnetic field sensitive loops 80, 81 connected by wires 82, 83, respectively, to a resonant energy storage device in the form of an electrical tank circuit 84. The tank circuit 84 is incorporated in the structure housing the preamplifier 36 which, as was the case with the gravitational sensor, is rotated with the sensing elements. The loops 80, 81 are differentially connected to each other and to the tank circuit 84 so that equal magnetic forces detected by the loops 80, 81 in directions transverse to the plane of these loops produces substantially zero signal energy to the tank circuit 84. The tank circuit 84 is coupled by means of a pick-up link 87 to the preamplifier 36. The loops 80, 81, the tank circuit 84 and the preamplifier 36 are rotated at a constant speed of 100 revolutions per second. The tank circuit 84, having an electrical Q of approximately 300 and comprising capacitor 85 and inductor 86, is designed to resonate at a multiple of the rotation frequency depending upon which order gradient is desired as an output. This aspect of this embodiment is substantially the same as has been previously described in connection with the gravitational gradient embodiment. The output from the preamplifier 36 is coupled to the narrow band amplifier 37 and the display device 40 through the slip ring arrangement 43, also previously described. According to this embodiment, the manner in which the loops 80, 81 are rotated provides the type of gradients and magnetic fields that will be measured.

Figure 14:
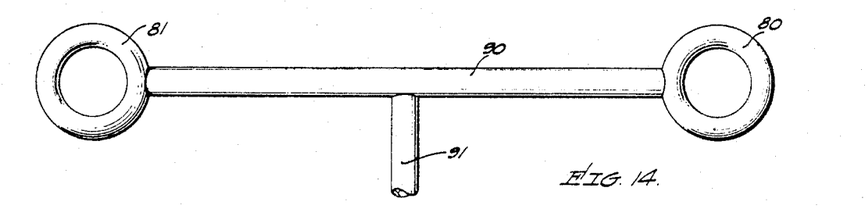
FIG. 14 illustrates one form of a portion of a magnetic gradient sensor of FIG. 13.

FIG. 14 illustrates a method in which torsional gradients of a magnetic field in the plane of rotation can be measured. The loops 80, 81, which may be encapsulated in plastic (not shown), are provided at each end of an elongated hollow cylinder 90. The cylinder 90, including loops 80, 81, is symmetric about a hollow shaft 91 and is dynamically and statically balanced. The cylinder 90 and the shaft 91 are made of aluminum alloy and are hollow in order to accommodate the leads 82, 83 which are not shown in this figure. Of course, the leads 82, 83 may be attached to the outer surfaces of a solid elongated member and shaft. In operation, the shaft 91 is imparted with a rotational velocity by the motor 33 in the same manner that shaft 32 is rotated as illustrated in FIG. 1. For sensing the torsional gradients of a magnetic field in the plane of rotation of the loops, the loops 80, 81 are fastened to the elongated cylinder 90 so that their loop axes are tangential to the periphery of the circle of rotation of the gradient sensor.

Figure 15:
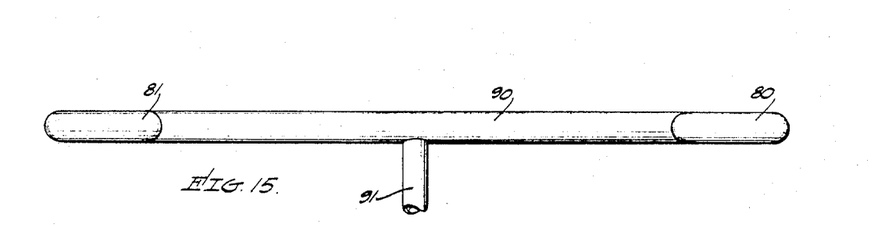
FIG. 15 illustrates another form of a portion of a magnetic gradient sensor of FIG. 13.

In order to measure the torsional gradients of a vertical magnetic field at right angles to the plane of rotation of the loops, a configuration as shown in FIG. 15 may be used. Here, it will be noted that the axes of the loops 80, 81 lie the same plane and are orthogonal to the plane of rotation.

Figure 16:
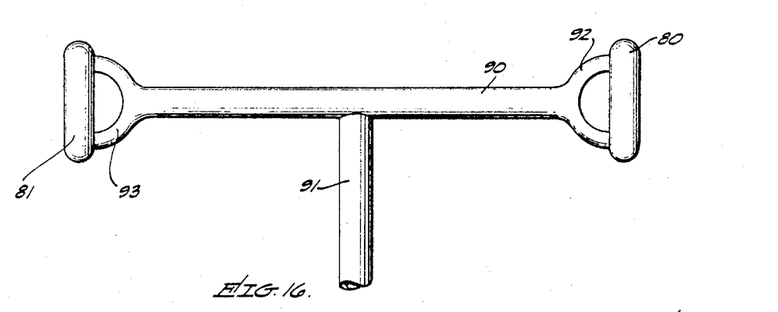
FIG. 16 illustrates still another form of a portion of the magnetic gradient sensor of FIG. 13.

FIG. 16 illustrates a method of measuring the radial gradients of a magnetic field in the plane of rotation of the loops. The cylinder 90 is provided with yoke portions 92, 93 at both ends thereof so that the loops 80, 81 may be supported with their axes lying along the longitudinal axis of the cylinder 90.

Figures 17, 19:
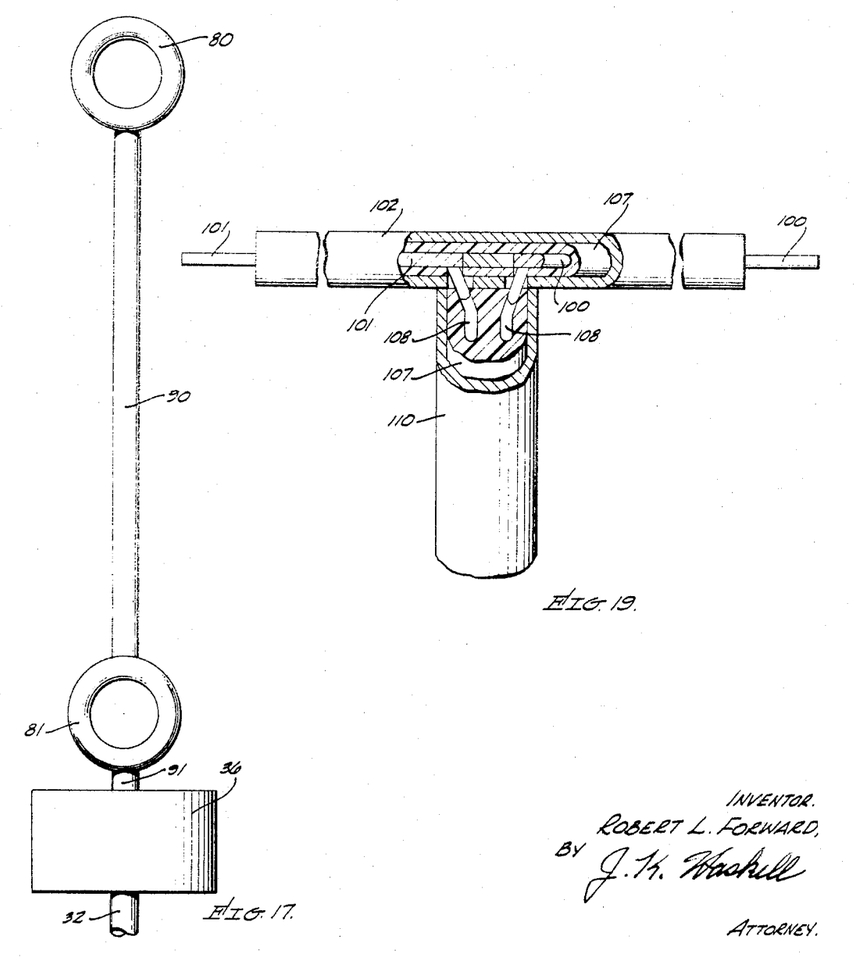
FIG. 17 is yet another form of a portion of the magnetic gradient sensor of FIG. 13.
FIG. 19 illustrates one form of a portion of an electric gradient sensor of FIG. 18.

For measuring the torsional gradients of a horizontal magnetic field at right angles to the axis of rotation of the shaft, the instrument may be constructed as shown in FIG. 17. The loops 80, 81 and the cylinder 90 are rigidly supported by the upper end of the shaft 91 with the longitudinal axis of the cylinder 90 coaxial therewith. The shaft 91 is shown attached to the strong plastic material encapsulating the loop 81 but the support means may also comprise a bifurcated yoke supporting the cylinder 90 at its center, for example. In this arrangement, the axes of the loops 80, 81 are parallel and orthogonal to the longitudinal axis of the cylinder 90.

A static magnetic force field gradient sensor can also comprise a permanent bar magnet rotated about its center of mass and acoustically resonant to multiple of the rotation frequency. This configuration may resemble that shown in FIG. 6, where end portions 95, 96 of the elongated member 31 represent a north and south pole, respectively. The stored acoustic energy can be sampled with the electromechanical strain transducers 34, 35. Also in this embodiment, the elongated member 31 may be replaced with a double ended bar magnet having, for example, a north pole at each end 95, 96 and a south pole at its center where the shaft 32 is attached. Furthermore, a bar magnet may be substituted for the elongated member shown in the configuration of FIG. 10, but without the cylindrical masses 41, 42, of course.

Figure 18:
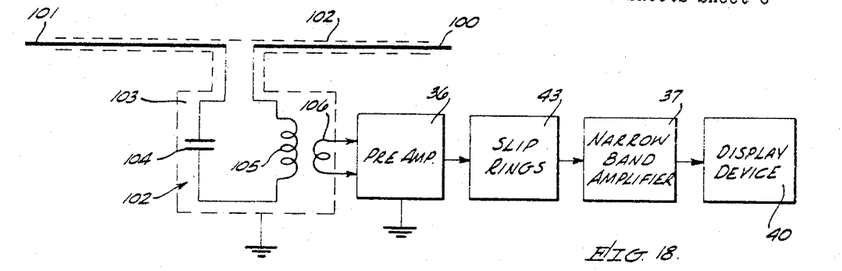
FIG. 18 is a schematic diagram of the electronic circuit of a static electric gradient sensor according to the invention.

Static electric force field gradients may also be measured by principles according to the present invention. FIG. 18 is a schematic diagram of this type of gradient measurement device. Here, the electric field sensing elements are two dipole elements 100, 101 which are shielded by a shield 102 except for the extreme end portions of the elements 100, 101. The elements 100, 101 are connected to an electric resonant tank circuit 103 comprising a capacitor 104 and an inductor 105, both of which are also enclosed by the shielding 102. A sample from the energy stored in the tank circuit 103 is coupled out to the preamplifier 36 by a coupling link 106 where this energy is amplified and coupled to the narrow band amplifier 37 and the display device 40 through the slip ring arrangement 43 in the same manner as was the case with both the gravitational and magnetic gradient measurement configurations described previously.

This electric field gradient measuring device is somewhat similar in appearance to a low frequency radio antenna except that the length of the dipole that would normally be used in the present electric field gradient sensor is required by practical considerations (high revolutions per second) to be less than a few feet long. Thus, this configuration is almost valueless as a device to measure time varying radiation fields (radio waves) with their characteristic electric field amplitudes of a few microvolts per meter. However, in measuring gradients of electric force fields due to a charge, the field strengths dealt with are nearly always greater than a volt per meter and very often megavolts per meter. The gradients are also large, typical values being kilovolts per meter per meter, so that a rotating dipole one meter long acts as if if were in a nonuniformly time varying electric field of kilovolts per meter. This will induce substantial currents in the dipole at multiples of the rotation frequency. These time varying currents are then stored in the resonant tank circuit 103 to be thereafter amplified and displayed.

A preferred dipole configuration for this type of gradient sensor is shown in FIG. 19. The dipole elements 100, 101 are insulated from the shield 102 by a dielectric material 107, such as polystyrene. The length of the dipole comprised of elements 100, 101 is 30 centimeters long, with 2.54 cm. exposed at the ends. The energy induced in the dipole elements 100, 101 is connected to the tank circuit 103 by leads 108 which are insulated from a hollow rotating shaft 110 by the insulation material 107.

From the foregoing, it will be seen that there is achieved a system which is capable of measuring static gravitational, magnetic and electric force field gradients.

Although specific embodiments have been herein described, it will be appreciated that other organizations of the specific arrangements shown may be made within the spirit and scope of the invention. For example, to improve the dynamic characteristics, an additional elongated member supporting or comprising the force sensing portion of the system may be utilized to fabricate an orthogonally crossed or "x" frame configuration. Additionally, other similar components or elements may be substituted for those which have been particularly named.

Accordingly, it is intended that the foregoing disclosure and the showings made in the drawings shall be considered only as illustrations of the principles of this invention and are not to be construed in a limiting sense.

What is claimed is:

1. A system for measurement of static force field gradients, comprising: a resonant energy storage device including a plurality of spaced sensing elements responsive to a particular type of force field coupled thereto; means for imparting equally to said sensing elements a periodic motion through the force field being measured to induce in said sensing elements energy in the form of periodically varying signals; means for combining said signals from each of the plurality of sensing elements in said resonant energy storage device to form a resultant complex signal, said spacing of said plurality of sensing elements causing said complex signal to have gradient connoting components at various harmonic frequencies related to the frequency of the periodic motion of said sensing elements through the force field being measured, said storage device being resonant at a selected component frequency corresponding to a selected force gradient and excited thereby to provide a large amplitude response to the selected signal component; and output means coupled to said energy storage device and responsive to the large amplitude response for providing an output signal the magnitude of which is proportional to the magnitude of the selected gradient and the phase of which is indicative of the directional sense of the selected gradient.

2. A system for measurement of static force field gradients, comprising: a resonant energy storage device including a plurality of spaced sensing elements responsive to a particular type of force field coupled thereto; motor means for imparting equally to said sensing elements a periodic motion through the force field being measured to induce in said sensing elements energy in the form of periodically varying signals; means for combining said signals from each of the plurality of sensing elements in said resonant energy storage device to form a resultant complex signal, said spacing of said plurality of sensing elements causing said complex signal to have gradient connoting components at various harmonic frequencies related to the frequency of the periodic motion of said sensing elements through the force field being measured, said storage device being resonant at a selected component frequency corresponding to a selected force gradient and excited thereby to provide a large amplitude response to the selected signal component; preamplifier means electrically coupled to said storage device and responsive to said large amplitude response for amplifying the large amplitude response and providing an output signal; vacuum means including an evacuated chamber disposed about and completely enclosing said storage device, said motor means and said preamplifier means; circuit console means electrically coupled to said preamplifier and including a narrow band amplifier responsive to said output signal for providing an amplified output signal; and display means electrically coupled to said console means and to said motor means and responsive to said amplified output signal to provide a visual display representation of said amplified output signal correlated with the periodic motion imparted to said sensing elements by said motor means.

3. A system for measurement of static gravitational force field gradients, comprising a rotatable shaft; an elongated member orthogonally attached at its center to one end of said shaft, said member having a resonant mechanical vibration mode orthogonal to the axis of said shaft, the mode having a vibrational node at the center of said member; mass elements symmetrically disposed at each end of said member; differentially coupled electromechanical strain transducers attached to said member on each side of and adjacent to said shaft, a synchronous electric motor mechanically coupled to said shaft for rotating said shaft and said member whereby there is induced in said member energy in the form of a periodically varying complex signal having gradient connoting components at various harmonic frequencies related to the frequency at which said member is rotating, said member having a resonant frequency substantially equal to the frequency of a selected component corresponding to a selected gravitational force gradient and excited thereby to provide a large amplitude response to the selected component which is detected by said transducers; and output means coupled to said transducers and responsive to the large amplitude response for providing an output signal.

4. A system for measurement of static gravitational force field gradients, comprising a rotatable shaft; an elongated member orthogonally attached at its center to one end of said shaft, said member having a resonant mechanical vibration mode orthogonal to the axis of said shaft, the mode having a vibrational node at the center of said member; a cylindrical mass element symmetrically disposed at each end of said member; differentially coupled electromechanical strain transducers attached to said member on each side of and adjacent to said shaft; a synchronous electric motor mechanically coupled to said shaft for rotating said shaft and said member whereby there is induced in said member energy in the form of a periodically varying complex signal having gradient connoting components at various harmonic frequencies related to the frequency at which the member is rotating, said member having a resonant frequency substantially equal to the frequency of a selected component corresponding to a selected gravitational force gradient and excited thereby to provide a large amplitude response to the selected component which is detected by said transducers; and output means including a preamplifier and slip ring arrangement mounted on said shaft coupled to said transducers and responsive to the large amplitude response for providing an output signal.

5. A system for measurement of static gravitational force field gradients, comprising a rotatable shaft; an elongated member orthogonally attached at its center to one end of said shaft, said member having a resonant mechanical vibration mode orthogonal to the axis of said shaft, the mode having a vibrational node at the center of said member; electromechanical strain transducers attached to said member on each side of and adjacent to said shaft, said transducers being connected so that there is substantially no output therefrom when said system is operated in a uniform gravitational force field; a synchronous electric motor mechanically coupled to said shaft for rotating said shaft and said member whereby there is induced in said member by interaction between said member and the torsional gradients orthogonal to said axis energy in the form of a periodically varying complex signal having gradient connoting components at various harmonic frequencies related to the frequency at which the member is rotating, said member having a resonant frequency substantially equal to the frequency of a selected component corresponding to a selected gravitational force gradient order and excited thereby to provide a large amplitude response to the selected component which is detected by said transducers; and output means including a preamplifier and slip ring arrangement mounted on said shaft coupled to said transducers and responsive to the large amplitude response for providing an output signal.

6. A system for measurement of static gravitational force field gradients, comprising: a rotatable shaft having a bifurcated yoke attached to one end thereof; an elongated member having a resonant mechanical vibration mode orthogonal to the axis of said shaft, the mode having vibrational nodes along said mmeber, said member being attached to said yoke at said nodes and orthogonal to said shaft; cylindrical masses symmetrically disposed at each end of said member; differentially coupled electromechanical strain transducers attached to said member near two of said nodes; a synchronous electric motor mechanically coupled to said shaft for rotating said shaft and said member whereby there is induced in said member energy in the form of a periodically varying complex signal having gradient connoting components at various harmonic frequencies related to the frequency at which the member is rotating, said member having a resonant frequency identical to the frequency of a selected component corresponding to a selected gravitational force gradient and excited thereby to provide a large amplitude response to the selected component which is detected by said transducers; and output means including a preamplifier and slip ring arrangement mounted on said shaft coupled to said transducers and responsive to the large amplitude response for providing an output signal.

7. A system for measurement of static gravitational force field gradients, comprising: a rotatable shaft; an elongated member orthogonally attached as its center to one end of said shaft, said member including cylindrical masses symmetrically disposed at each end of said member and having a resonant mechanical vibration mode parallel to the axis of said shaft, the mode having a vibrational node at the center of said member; electromechanical strain transducer attached to said member on each side of and adjacent to said shaft, said transducers being connected so that there is substantially no output therefrom when said system is operated in a uniform gravitational force field; a synchronous electric motor mechanically coupled to said shaft for rotating said shaft and said member whereby there is induced in said member by interaction between said member and the torsional gradients parallel to said axis energy in the form of a periodically varying complex signal having gradient connoting components at various harmonic frequencies related to the frequency at which the member is rotating, said member having a resonant frequency identical to the frequency of a selected component corresponding to a selected gravitational force gradient order and excited thereby to provide a large amplitude response to the selected component which is detected by said transducers; and output means including a preamplifier and slip ring arrangement mounted on said shaft coupled to said transducers and responsive to the large amplitude response for providing an output signal.

8. A system for measurement of static gravitational force field gradients, comprising: a shaft rotatable about its longitudinal axis and having a bifurcated yoke member attached to one end thereof symmmetrical with said axis; an elongated member having a longitudinal axis and rigidly attached as its center to said yoke member so that its longitudinal axis is coincident with the longitudinal axis of said shaft, said member including cylindrical masses symmetrically disposed at each end of said member and having a resonant mechanical vibration mode orthogonal to the axis of said shaft, the mode having a vibrational node at the center of said member; differentially coupled electromechanical strain transducers attached to said member on each side of and adjacent to said center, a synchronous electric motor mechanically coupled to said shaft for rotating said shaft and said member whereby there is induced in said member by interaction between said member and the torsional gradients orthogonal to the axis of rotation energy in the form of a periodically varying complex signal having gradient connoting components at various harmonic frequencies related to the frequency at which said member is rotating, said member having a resonant frequency substantially equal to the frequency of a selected component corresponding to a selected gravitational force gradient order and excited thereby to provide a large amplitude response to the selected component which is detected by said transducers; and output means including a preamplifier and slip ring arrangement mounted on said shaft coupled to said transducers and responsive to the large amplitude response for providing an output signal.

9. A system for measurement of static gravitational force field gradients, comprising: a shaft rotatable about its longitudinal axis and having a support member rigidly attached to one end thereof, said support member being disposed symmetrically about the end of said shaft and having a longitudinal axis orthogonal to the longitudinal axis of said shaft; a vibrating system including a spring and connected spherical mass attached by one end of said spring to each end of said support member, said vibrating system having a resonant mechanical vibration mode orthogonal to the axis of said shaft; diaphragm support means rigidly attached to said shaft for restraining said spherical masses from motion in other than a radial direction coinciding with the longitudinal axis of said support member; differentially coupled electromechanical strain transducers attached to said support member on each side of and adjacent to said shaft; a synchronous electric motor mechanically coupled to said shaft for rotating said shaft and said vibrating system whereby there is induced in said vibrating system by interaction between said vibrating system and the radial gradients transverse to the longitudinal axis of said shaft energy in the form of a periodically varying complex signal having gradient connoting components at various harmonic frequencies related to the frequency at which said vibrating system is rotating, said vibrating system having a resonant frequency substantially equal to the frequency of a selected component corresponding to a selected gravitational force gradient order and excited thereby to provide a large amplitude response to the selected component which is detected by said transducers; and output means including a preamplifier and slip ring arrangement mounted on said shaft coupled to said transducers and responsive to the large amplitude response for providing an output signal.

10. A system for measurement of static magnetic force field gradients, comprising: a shaft rotatable about its longitudinal axis of rotation and having an elongated member rigidly attached at its center to one end of said shaft, said member having a longitudinal axis orthogonal to said axis of rotation; magnetic field sensitive loops symmetrically disposed at each end of said member, said loops having axes orthogonal to the longitudinal axis of said member and orthogonal to the axis of rotation; a resonant energy storage device coupled to said loops in a manner that there is substantially no energy stored in said storage device when said system is operated in a uniform magnetic force field; a synchronous electric motor mechanically coupled to said shaft for rotating said shaft and said member whereby there is induced in said storage device by interaction between said loops and the torsional gradients orthogonal to said axis of rotation energy in the form of a periodically varying complex signal having gradient connoting components at various harmonic frequencies related to the frequency at which said member is rotating, said storage device having a resonant frequency substantially equal to the frequency of a selected component corresponding to a selected magnetic force gradient order and excited thereby to provide a large amplitude response to the selected component; and output means coupled to said storage device and responsive to the large amplitude response for providing an output signal.

11. A system for measurement of static magnetic force field gradients, comprising: a shaft rotatable about its longitudinal axis of rotation and having an elongated member rigidly attached at its center to one end of said shaft, said member having a longitudinal axis orthogonal to said axis of rotation; magnetic field sensitive loops symmetrically disposed at each end of said member, said loop having axes orthogonal to the longitudinal axis of said member and parallel the axis of rotation; a resonant energy storage device coupled to said loops in a manner that there is substantially no energy stored in said storage device when said system is operated in a uniform magnetic force field; a synchronous electric motor mechanically coupled to said shaft for rotating said shaft and said member whereby there is induced in said storage device by interaction between said loops and the torsional gradients parallel to said axis of rotation energy in the form of a periodically varying complex signal having gradient connoting components at various harmonic frequencies related to the frequency at which said member is rotating, said storage device having a resonant frequency substantially equal to the frequency of a selected component corresponding to a selected magnetic force gradient order and excited thereby to provide a large amplitude response to the selected component; and output means coupled to said storage device and responsive to the large amplitude response for providing an output signal.

12. A system for measurement of static magnetic force field gradients, comprising: a shaft rotatable about its longitudinal axis of rotation and having a longitudinal member rigidly attached at its center to one end of said shaft, said member having a longitudinal axis orthogonal to said axis of rotation and having a bifurcated yoke symmetrically attached at each end of said member; magnetic field sensitive loops symmetrically disposed on each of said yokes, said loops having axes coincident with the longitudinal axis of said member; a resonant energy storage device coupled to said loops in a manner that there is substantially no energy stored in said storage device when said system is operated in a uniform magnetic force field; a synchronous electric motor mechanically coupled to said shaft for rotating said shaft and said member whereby there is induced in said storage device by interaction between said loops and the radial gradients in the plane of rotation of said member energy in the form of a periodically varying complex signal having gradient connoting components at various harmonic frequencies related to the frequency at which said member is rotating, said storage device having a resonant frequency substantially equal to the frequency of a selected component corresponding to a selected magnetic force gradient order and excited thereby to provide a large amplitude response to the selected component; and output means coupled to said storage device and responsive to the large amplitude response for providing an output signal.

13. A system for measurement of static magnetic force field gradients, comprising: a shaft rotatable about its longitudinal axis of rotation; an elongated member having a longitudinal axis; magnetic field sensitive loops symmetrically disposed at each end of said member, said loops having axes parallel to each other and orthogonal to the longitudinal axis of said member; support means coupled to one end of said shaft and to said member to rigidly support said member so that the lonigtudinal axis of said member coincides with said axis of rotation; a resonant energy storage device coupled to said loops in a manner that there is substantially no energy stored in said storage device when said system is operated in a uniform magnetic force field, a synchronous electric motor mechanically coupled to said shaft for rotating said shaft and said member whereby there is induced in said storage device by interaction between said loops and the torsional gradients orthogonal to said axis of rotation energy in the form of a periodically varying complex signal having gradient connoting components at various harmonic frequencies related to the frequency at which said member is rotating, said storage device having a resonant frequency substantially equal to the frequency of a selected component corresponding to a selected magnetic force gradient order and excited thereby to provide a large amplitude response to the selected component; and output means coupled to said storage device and responsive to the large amplitude response for providing an output signal.

14. A system for measurement of static electric force field gradients, comprising: a cylindrical hollow shaft rotatable about its longitudinal rotational axis and having a cylindrical hollow member rigidly attached at its center to one end of said shaft, said member having a longitudinal axis orthogonal to said rotational axis, the inner surface of said member communicating with the inner surface of said shaft; electric field sensing dipole elements coaxially disposed within and extending beyond said member, said dipole elements being insulated from said member and having a transmission line connected to the adjacent ends of said elements adjacent the junction of said member and said shaft, said transmission line being disposed along said rotational axis symmetrically within said shaft and insulated therefrom; a resonant energy storage device coupled to said transmission line; a synchronous electric motor mechanically coupled to said shaft for rotating said shaft and said member whereby there is induced in said storage device by interaction between the portions of said dipole elements extending beyond said member and the radial electric field gradients in the form of a periodically varying complex signal having gradient connoting components at various harmonic frequencies related to the frequency at which said member is rotating, said storage device having a resonant frequency substantially equal to the frequency of a selected component corresponding to a selected electric force gradient order and excited thereby to provide a large amplitude response to the selected component; and output means coupled to said storage device and responsive to the large amplitude response for providing an output signal.

References Cited by the Examiner

UNITED STATES PATENTS

| | | | |
|---|---|---|---|
| 2,403,999 | 7/1946 | Read et al. | 73—67.2 |
| 2,716,893 | 9/1955 | Birdsall | 73—504 X |
| 3,180,151 | 4/1965 | Gustafsson | 73—382 |

FOREIGN PATENTS

| | | |
|---|---|---|
| 1,115,470 | 10/1961 | Germany. |
| 1,149,541 | 5/1963 | Germany. |

RICHARD C. QUEISSER, *Primary Examiner.*

J. C. GOLDSTEIN, *Assistant Examiner.*